United States Patent [19]

Hou et al.

[11] Patent Number: 4,786,839
[45] Date of Patent: Nov. 22, 1988

[54] SINGLE CRYSTAL YAG COLOR CRT

[75] Inventors: Tien-Wen Hou, Berkeley Heights; Tai-Chan D. Huo, New Providence, both of N.J.

[73] Assignee: American Telephone and Telegraph Company AT&T Bell Laboratories, Murray Hill, N.J.

[21] Appl. No.: 786,844

[22] Filed: Oct. 11, 1985

[51] Int. Cl.[4] ............................................ H01J 49/10
[52] U.S. Cl. .................................... 313/473; 313/463
[58] Field of Search ............... 313/467, 473; 156/600, 156/647, 648, 653; 358/67, 68

[56] References Cited
U.S. PATENT DOCUMENTS 4,106,975 8/1978 Berkenblit et al. ............... 156/628
4,298,820 11/1981 Bongers et al. ..................... 313/463
4,514,756 4/1985 Blank et al. .......................... 358/66
4,550,256 10/1985 Berkstresser et al. ........... 250/483.1

OTHER PUBLICATIONS

"Growth of High-Quality Garnet Thin Films from Supercooled Melts", *Applied Physics Letters*, vol. 19, No. 11, (Dec. 1971) pp. 486-488, H. J. Levinstein et al.

Primary Examiner—David K. Moore
Attorney, Agent, or Firm—Michael J. Urbano

[57] ABSTRACT

The target of a color CRT includes a plurality of color stripe triads which are oriented on a (111) surface parallel to the <112> crystallographic direction. The pattern of the stripe triads is etched using a $SiO_2$ etch mask deposited directly on the YAG and an etchant comprising a hot mixture of sulfuric and phosphoric acids.

6 Claims, 3 Drawing Sheets

WEIGHTS (gm) OF MELT COMPONENTS

| COMPONENTS | GREEN | BLUE | RED I | RED II |
|---|---|---|---|---|
| $PbO$ | 6000.00 | 0.00 | 1500.00 | 1500.00 |
| $B_2O_3$ | 154.00 | 43.50 | 38.83 | 38.83 |
| $Al_2O_3$ | 42.44 | 33.23 | 15.38 | 15.42 |
| $Y_2O_3$ | 17.52 | 19.73 | 9.08 | 9.10 |
| $CeO_2$ | 18.11 | 0.00 | 0.00 | 0.00 |
| $Tb_4O_7$ | 4.43 | 0.00 | 0.00 | 0.00 |
| $Bi_2O_3$ | 0.00 | 1500.00 | 0.00 | 0.00 |
| $Cr_2O_3$ | 0.00 | 0.00 | 2.55 | 0.00 |
| $Eu_2O_3$ | 0.00 | 0.00 | 0.00 | 0.95 |

SCHEMATIC OF THE COLOR CRT MANUFACTURING PROCESS

SINGLE CRYSTAL YAG COLOR CRT

BACKGROUND OF THE INVENTION

This invention relates to cathode ray tubes (CRTs) and, more particularly, to CRTs in which the target is made of single crystal yttrium aluminum garnet (YAG; $Y_3Al_5O_{12}$).

In U.S. Pat. No. 4,514,756 assigned to the assignee hereof, S. L. Blank and E. I. Gordon describe a target for a single beam color CRT. The target as shown in FIG. 2 of the patent and reproduced as FIG. 1 herein, comprises a plurality of color stripe triads: layer R for generating red light, layer G for generating green light, and layer B for generating blue light. These stripes are arranged on a substrate 14 in a staircase geometry so that, as viewed by the e-beam 12, they appear as side-by-side color stripes. The particular arrangement with the red stripe on the top and the blue stripe on the bottom is illustrative only—any sequence of the three primary colors is suitable.

Overlaying each stripe triad is a metal layer. Two metal layers designated 20.1 and 30.1 are depicted as overlaying adjacent triads. The e-beam 12 is modulated with video (color) information and made to scan horizontally (i.e., transversely) across the electrodes in the direction, for example, of arrow 17. The metal layers do not stop the electrons which penetrate into the stripes R, G and B. The e-beam energy is chosen, however, so that the electrons are absorbed in only the uppermost color stripe. Thus the beam produces only a single primary color at a time (i.e., in a given beam position). For example, in the figure, for the beam position shown, the electrons are absorbed in the green stripe G and generate light of wavelength $\lambda_G$, but they do not have enough energy to penetrate into the underlying blue stripe B. The light intensity is modulated by modulating the e-beam current as is well-known in the art.

In a high-brightness CRT, of the type suitable for a projection CRT system, the target comprises a YAG substrate 14 on which are epitaxially grown three YAG layers, each one producing a primary color for use in color display. Illustratively the R layer comprises Eu:YAG, the G layer comprises Ce:YAG and the B layer comprises Bi:YAG. These layers are then etched or otherwise suitably shaped to form the staircase configuration.

YAG has been etched by a number of techniques in the prior art. Reactive sputter etching is described briefly in U.S. Pat. No. 4,298,820 granted to P. F. Bongers et al on Nov. 3, 1981. However, sputter etching involves an extremely slow etch rate (approximately 14 Å/min) and, therefore, is impractical for large scale production. On the other hand, wet chemical etching using a complicated mask structure is described by M. Berkenblit et al in U.S. Pat. No. 4,106,975 issued on Aug. 15, 1978. The Berkenblit process, which is directed to etching pyramid-like holes in YAG for fluid spray nozzles in jet printing applications, involves five layers of masking material, one heat treatment (temperatures between 700° C. and 1100° C. for between 15 minutes and 2 hours), and three wet chemical etching steps. This process is complex, time consuming, costly and not practical for large scale manufacturing either. A simpler mask and etching process are clearly desirable.

Although a simple layer of $SiO_2$ is a common mask for etching semiconductors, it is not known to utilize it as an etching mask directly on YAG. Indeed the disparate chemical properties of semiconductors and YAG strongly suggest that the substitution is not an obvious one. This conclusion is supported by the Berkenblit et al patent (FIG. 1) which utilizes a composite three-layer metal mask of chromium 2, platinum 3, and chromium 4 to etch a YAG substrate 1, but uses an $SiO_2$ layer 5 only as a mask to etch the stack of metal layers. For chemical reasons related to adhesion, the $SiO_2$ layer 5 is not deposited directly on the YAG substrate nor is it even present when the YAG is being etched. (See column 6, lines 15-19 of the Berkenblit et al patent.)

As noted in Berkenblit et al at column 3, lines 32-34, the ability to etch a material such as YAG is a very complex and empirical art. The unpredictability of the action of a particular etchant mixture and the suitability of mask materials, in combination with the importance placed by Berkenblit et al on the use of a composite metal mask to etch YAG, make it clear that it is not obvious to use $SiO_2$ directly on YAG as a mask to etch stripes for a color CRT target.

SUMMARY OF THE INVENTION

In accordance with one aspect of our invention, we have found that the stripes of the color triads on a (111) surface of a YAG target should be oriented parallel to a <112> direction in order to preserve color definition and high resolution. In accordance with another aspect of our invention, the stripes of the triads in a staircase geometry are etched by depositing a $SiO_2$ layer directly on the YAG material, patterning the $SiO_2$ mask layer to define stripes along a <112> direction, and then etching the exposed YAG with a hot mixture of phosphoric and sulfuric acids.

BRIEF DESCRIPTION OF THE DRAWING

Our invention, together with its various features and advantages, can be readily understood from the following more detailed description taken in conjunction with the accompanying drawing, in which.

DETAILED DESCRIPTION

Figure 2:
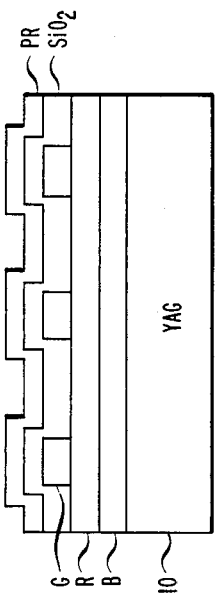
FIGS. 2-7 show an illustrative sequence of fabricating a target of the type shown in FIG. 1 in accordance with one embodiment of our invention.
Figure 3:
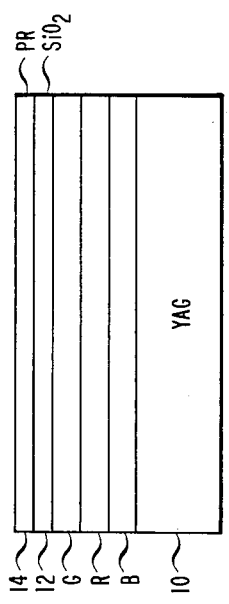
Figure 4:
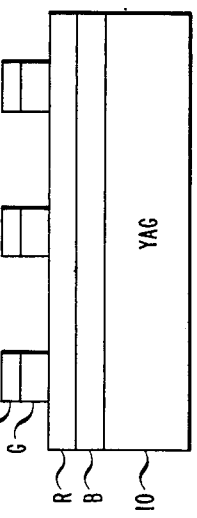

Turning now to FIG. 2, a (111) oriented YAG substrate 10 is obtained from commercial sources. This orientation is preferred to (100) because the latter typically implies a 10-20% lower luminescent efficiency of the green (G), red (R) and blue (B) phosphor YAG layers epitaxially grown on the substrate 10. In order to shape the epitaxial layers, an $SiO_2$ layer 12 is deposited directly on the uppermost epitaxial layer, the G layer in this case, and a layer 14 of photoresist (PR) is deposited on the $SiO_2$ layer 12, preferably using plasma deposition. Using standard photolithography, stripe openings parallel to the <112> direction are formed in the PR layer 14. Next, similar openings are etched in the $SiO_2$ layer 14, leaving composite masks 12'–14' as shown in FIG. 3. The PR is removed and the epitaxial layer G is subjected to a hot mixture of sulfuric and phosphoric acids, illustratively at a temperature in the range of about 200° C. to 325° C. and preferably at a temperature of about 240° C. to 300° C. Below 240° C. the etching rate may be too slow for practical applications and above 300° C. the adhesion of the SiO$_2$ may deteriorate. Etching continues for a time sufficient to etch through only the G layer and not appreciably into the underlying R layer as shown in FIG. 4.

Figure 5:
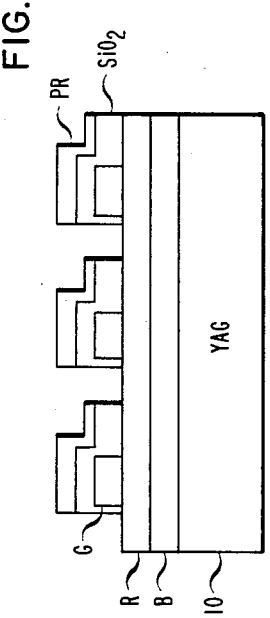
Figure 6:
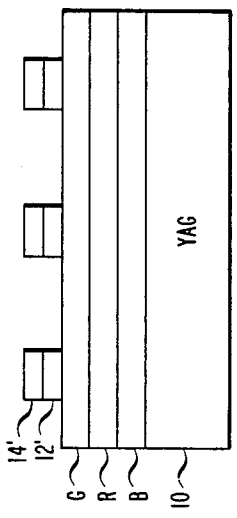
Figure 7:
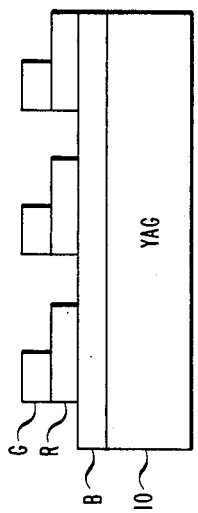

In order to etch the R layer, the remaining SiO$_2$ mask (FIG. 4) is removed and then the above procedure is repeated beginning with SiO$_2$ and PR deposition (FIG. 5), pattern definition (FIG. 6), and etching the R layer in a hot mixture of sulfuric and phosphoric acids (FIG. 6). Note, the common B layer need not be etched. Instead, the gap between the overlying R layers defines the stripes of B layers. The resulting staircase configuration is shown in FIG. 7. Metal layers (not shown), such as the interdigitated electrodes of the Blank-Gordon patent, are then deposited over each of stripe triads.

EXAMPLE

Figures 1, 8:
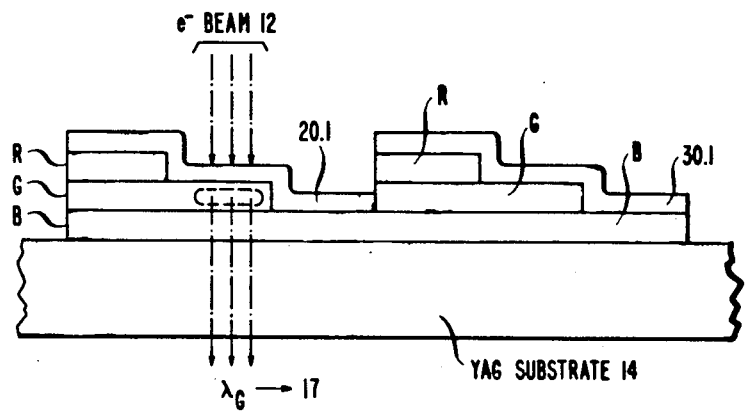
FIG. 1 is a cross-sectional view (without cross hatching) of a staircase geometry color CRT target of the prior art.
FIG. 8 is a table giving the melt compositions of green, blue and two red YAG phosphors used to demonstrate certain embodiments of our invention.

The following example describes the fabrication of a color target on a (111) oriented YAG substrate measuring 2 inches in diameter and 0.056 inches thick. The substrate was purchased from Allied Chemical Co. of Morristown, N.J. The G, R and B YAG phosphor layers were grown epitaxially using LPE. The growth technique was similar to that used to grow iron-garnet materials as described by H. J. Levinstein et al, Applied Physics Letters, Vol. 19, p. 486 (1971). The solvent in which the constituent garnet oxides were dissolved was PbO:B$_2$O$_3$. The melt compositions used for the growth of green (Ce/Tb:YAG), blue (Bi:YAG), red I (Cr:YAG) and red II (Eu:YAG) phosphors are listed in FIG. 8. Only one of the red phosphors was used in each target. The fluorescent spectrum of the epitaxial layers peaked at about 610 nm (red), 430 nm (blue), and 540 nm (green). A chromaticity diagram of our single crystal phosphors covers nearly the same color area as the well-known color picture tube phosphor, P$_{22}$.

Our ability to fabricate the staircase configuration of FIG. 7 depended heavily on the masking material properties (adhesion and step coverage) and the controllability of the YAG etching rate. The temperature dependence of the etching rate of (111) oriented YAG is a mixture of sulfuric and phosphoric acids was essentially linear above about 180° C. with a slope of about 0.2 um/min/100° C. The etching rate was easily controlled between 0.5 and 1.7 μm/min by varying the temperature from 200° C. to 260° C. The latter temperature was a limitation only of the hotplate used to heat the acid mixture. Higher temperatures can be used to perform the actual etching as indicated earlier.

Figure 9:
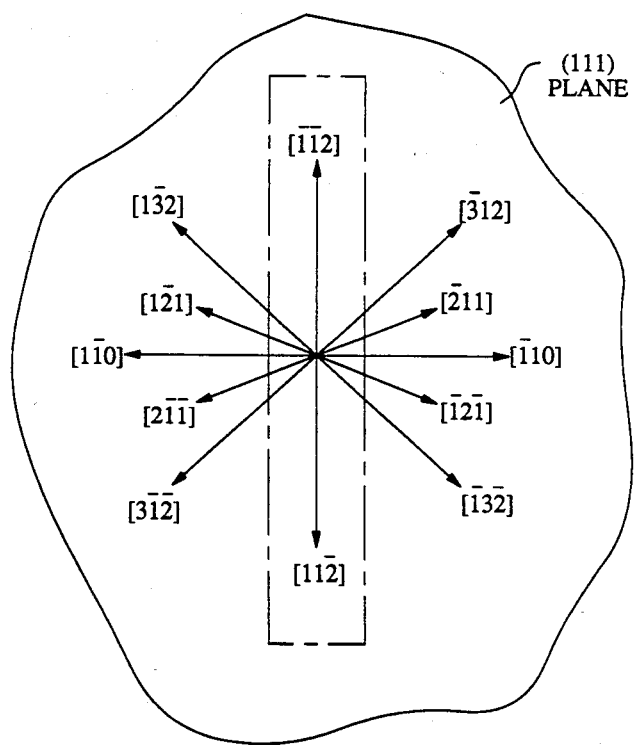
FIG. 9 is a schematic top view showing the orientation of a number of crystallographic directions which lie in the (111) plane. A striped shaped layer, depicted in phantom, is shown oriented along the [11$\bar{2}$] direction.

To optimize the color definition and resolution of the triad target, the walls of the stripes should be as vertical as possible to avoid axialmetric profile problems. Thus, the crystallographic direction of the mask pattern is important. For a (111) YAG surface, essentially vertical side walls and symmetrical cross section of a stripe are obtained only when the stripes on the (111) surface are parallel to a <112> direction (FIG. 9). As with standard Miller indices for crystallographic directions, the designation <112> defines a family of directions including [11$\bar{2}$], [$\bar{1}$2$\bar{1}$], [$\bar{2}$11] and those opposite thereto (e.g., the [121] direction).

For pattern definition, a plasma deposited SiO$_2$ layer 12 (9000 Å thick) was used directly on the G layer as the masking material. The plasma deposition conditions were not critical and illustratively were as follows: total flow-719 sccm including SiH$_4$ at 104 sccm (14.46%) and N$_2$O at 615 sccm (85.54%); power-500 W; pressure-0.37 torr; substrate temperature-275° C. A suitable range for the substrate temperatures is 150° C. to 400° C. Although plasma deposition may be preferred from the standpoint of its ability to clean the epitaxial surface and thereby produce good mask adhesion to the YAG layers, other SiO$_2$ deposition techniques (such as CVD, e-beam evaporation, sputter deposition, or spin-on SiO$_2$) may be suitable.

A positive photoresist (HPR-204) layer 14 was then spun onto the sample and patterned by well-known contact photolithography. The PR layer 14 acted as a mask for etching the SiO$_2$ layer in a CF$_4$+8% O$_2$ plasma. The PR was stripped in an O$_2$ plasma. The G layer was then etched in a phosphoric and sulfuric acid mixed in a volume ratio of 3:1 at a temperature of 240° C. The etching was performed in stages with the step height being measured with a commercially available profilometer and was stopped when the step height was equal to the epitaxial layer thickness plus the SiO$_2$ layer thickness. The SiO$_2$ mask was then stripped in a CF$_4$+8% O$_2$ plasma. This process sequence is schematically shown in FIGS. 2–4. To etch the R layer, the process steps above were repeated as shown in FIGS. 5–7.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, an additional advantage of using SiO$_2$ as the YAG etch mask arises from its transparency to radiation wavelengths from visible to infrared, which facilitates alignment of the subsequent masks (FIGS. 5–6) with the already etched pattern.

What is claimed is:

1. In a color CRT, a target comprising
    a (111) oriented YAG substrate, and
    a plurality of epitaxial YAG layers grown on said substrate so as to be capable of generating a plurality of colors in response to an electron beam,
    at least one of said layers having the form of a stripe oriented essentially parallel to a <112> direction in the (111) plane to avoid axialmetric profile problems.

2. The target of claim 1 wherein said epitaxial layers comprise a plurality of color triads having a staircase geometry of stripes oriented essentially parallel to the <112> direction.

3. A method of etching single crystal YAG comprising the steps of:
    depositing a SiO$_2$ layer directly on said YAG,
    patterning said SiO$_2$ layer to form openings, and
    subjecting the exposed portions of said YAG to a hot mixture of phosphoric and sulfuric acids.

4. The method of claim 3 wherein
    said patterning step forms stripe-shaped openings oriented essentially parallel to the <112> crystallographic direction and said SiO$_2$ layer is formed on a (111) surface of said YAG.

5. The method of claim 3 wherein said silicon dioxide layer is formed by a plasma deposition process.

6. The method of claim 3 wherein said mixture has a temperature between approximately 240° C. and 300° C.

* * * * *